(12) United States Patent
Seymour et al.

(10) Patent No.: US 8,461,507 B2
(45) Date of Patent: Jun. 11, 2013

(54) DEVICE SYSTEM AND METHOD FOR COUPLING MULTIPLE PHOTOVOLTAIC ARRAYS

(75) Inventors: Eric Seymour, Fort Collins, CO (US); Jack Arthur Gilmore, Fort Collins, CO (US)

(73) Assignee: Advanced Energy Industries, Inc, Fort Collins, CO (US)

( * ) Notice: Subject to any disclaimer, the term of this patent is extended or adjusted under 35 U.S.C. 154(b) by 905 days.

(21) Appl. No.: 12/581,793

(22) Filed: Oct. 19, 2009

(65) Prior Publication Data

US 2010/0032002 A1 Feb. 11, 2010

Related U.S. Application Data

(63) Continuation of application No. 12/189,187, filed on Aug. 10, 2008, now Pat. No. 7,619,200.

(51) Int. Cl.
*G05F 5/00* (2006.01)
(52) U.S. Cl.
USPC ...................................... 250/214 R; 323/222
(58) Field of Classification Search
USPC ............ 250/214 R, 214.1; 323/222, 282–285
See application file for complete search history.

(56) References Cited

U.S. PATENT DOCUMENTS

| | | |
|---|---|---|
| 3,986,097 A | 10/1976 | Woods |
| 4,025,862 A | 5/1977 | Gautheron |
| 4,054,827 A | 10/1977 | Reimers |
| 4,080,646 A | 3/1978 | Dietrich |
| 4,128,793 A | 12/1978 | Stich |
| 4,161,023 A | 7/1979 | Goffeau |
| 4,531,085 A | 7/1985 | Mesenhimer |
| 4,678,983 A | 7/1987 | Rouzies |
| 4,748,311 A | 5/1988 | Thomas |
| 4,768,096 A | 8/1988 | Cannella et al. |
| 5,270,636 A | 12/1993 | Lafferty |
| 5,451,962 A | 9/1995 | Steigerwald |
| 5,781,419 A | 7/1998 | Kutkut |
| 5,923,100 A | 7/1999 | Lukens et al. |
| 5,932,994 A | 8/1999 | Jo et al. |
| 6,093,885 A | 7/2000 | Takehara et al. |
| 6,115,273 A | 9/2000 | Geissler |
| 6,266,260 B1 | 7/2001 | Zahrte |

(Continued)

FOREIGN PATENT DOCUMENTS

| | | |
|---|---|---|
| JP | 08-98549 A1 | 2/1978 |
| JP | 05-025890 A | 2/1993 |

(Continued)

OTHER PUBLICATIONS

Nguyen, Danny, "Office Action re U.S. Appl. No. 12/830,380", Jun. 3, 2011, p. 28 Published in: US.

(Continued)

*Primary Examiner* — Seung C Sohn
(74) *Attorney, Agent, or Firm* — Neugeboren O'Dowd PC

(57) ABSTRACT

A photovoltaic system, method and apparatus are disclosed. In an exemplary embodiment, the system includes a power converter configured to convert power from one form to another form, and an interface portion adapted to couple to the power converter, a first photovoltaic array, a second photovoltaic array, and a third photovoltaic array. In variations, the interface portion is configured to modulate an application of a voltage from the first photovoltaic array to the second and third photovoltaic arrays so as to adjust a voltage applied from the three photovoltaic arrays to the power converter.

2 Claims, 5 Drawing Sheets

U.S. PATENT DOCUMENTS

| | | | |
|---|---|---|---|
| 6,404,655 | B1 | 6/2002 | Welches |
| 6,414,866 | B2 | 7/2002 | Huggett et al. |
| 6,625,046 | B2 | 9/2003 | Geissler |
| 6,750,391 | B2 | 6/2004 | Bower et al. |
| 6,812,396 | B2 | 11/2004 | Makita |
| 6,914,418 | B2 | 7/2005 | Sung |
| 7,053,506 | B2 | 5/2006 | Alonso |
| 7,158,395 | B2 | 1/2007 | Deng et al. |
| 7,193,872 | B2 | 3/2007 | Siri et al. |
| 7,292,419 | B1 | 11/2007 | Nemir |
| 6,844,739 | B2 | 1/2008 | Kasai et al. |
| 7,371,963 | B2 | 5/2008 | Suenaga et al. |
| 7,456,524 | B2 | 11/2008 | Nielsen et al. |
| 7,619,200 | B1 | 11/2009 | Seymour |
| 7,701,081 | B2 | 4/2010 | Seymour |
| 7,768,751 | B2 | 8/2010 | Gilmore et al. |
| 2001/0004322 | A1 | 6/2001 | Kurokami |
| 2001/0023703 | A1 | 9/2001 | Kondo et al. |
| 2001/0048605 | A1 | 12/2001 | Kurokami et al. |
| 2002/0105765 | A1 | 8/2002 | Kondo et al. |
| 2003/0111103 | A1 | 6/2003 | Bower et al. |
| 2003/0155887 | A1 | 8/2003 | Bourilkov et al. |
| 2003/0172968 | A1 | 9/2003 | Armer et al. |
| 2004/0041665 | A1 | 3/2004 | Hode et al. |
| 2004/0211459 | A1 | 10/2004 | Suenaga et al. |
| 2005/0139259 | A1 | 6/2005 | Steigerwald |
| 2005/0180181 | A1 | 8/2005 | Gaudreau et al. |
| 2005/0279402 | A1 | 12/2005 | Ahn et al. |
| 2006/0162772 | A1 | 7/2006 | Presher, Jr. et al. |
| 2006/0171182 | A1 | 8/2006 | Siri et al. |
| 2006/0221653 | A1 | 10/2006 | Lai |
| 2006/0227472 | A1 | 10/2006 | Taylor |
| 2008/0291706 | A1 | 11/2008 | Seymour et al. |
| 2009/0032082 | A1 | 2/2009 | Gilmore |
| 2009/0078304 | A1 | 3/2009 | Gilmore |
| 2009/0167086 | A1 | 7/2009 | Seymour |
| 2009/0167097 | A1 | 7/2009 | Seymour et al. |
| 2009/0190275 | A1 | 7/2009 | Gilmore |
| 2009/0217964 | A1 | 9/2009 | Gilmore et al. |
| 2009/0283130 | A1 | 11/2009 | Gilmore |
| 2010/0132758 | A1 | 6/2010 | Gilmore |
| 2010/0308662 | A1 | 12/2010 | Schatz et al. |
| 2011/0157753 | A1 | 6/2011 | Gilmore et al. |
| 2011/0168229 | A1 | 7/2011 | Gilmore et al. |

FOREIGN PATENT DOCUMENTS

| | | | |
|---|---|---|---|
| JP | 06-252434 A | | 9/1994 |
| JP | 07049721 | | 2/1995 |
| JP | 09-054623 A2 | | 2/1997 |
| JP | 10-014111 | | 1/1998 |
| JP | 10-229679 | | 8/1998 |
| JP | 11285260 | | 10/1999 |
| JP | 2000-295786 A | | 10/2000 |
| JP | 2000358370 | | 12/2000 |
| JP | 2002-319687 A | | 10/2002 |
| JP | 2003-124492 A | | 4/2003 |
| JP | 2004015941 | | 1/2004 |
| JP | 2004343909 | | 12/2004 |
| JP | 2005204485 | | 7/2005 |
| JP | 2006187150 | | 7/2006 |
| JP | 2007133765 A | | 5/2007 |
| JP | 2007-201257 A | | 8/2007 |
| KR | 10-2006-0100840 | | 9/2006 |
| KR | 20-2006-0021132 | | 10/2006 |
| WO | 2007022955 | | 1/2007 |
| WO | 2010065388 A1 | | 6/2010 |
| WO | 2011011022 A1 | | 1/2011 |
| WO | 2011094654 A1 | | 8/2011 |

OTHER PUBLICATIONS

Gardner, Shannon M., "Office Action re U.S. Appl. No. 12/184,535", Jun. 17, 2011, p. 9 Published in: US.
Bernier, Lindsey A., "Office Action re U.S. Appl. No. 12/326,209", Jun. 28, 2011, p. 7, Published in: US.
Athina Nickitas-Etienne, "International Preliminary Report on Patentability re Application No. PCT/US09/65629", Jun. 16, 2011, Published in: CH.
Sean R. O'Dowd, "Response to Jun. 28, 2011 Office Action re U.S. Appl. No. 12/326,209", Jul. 28, 2011, Published in: US.
Kolev, Vesselin, "International Search Report and Written Opinion re Application PCT/US11/023081", Apr. 27, 2011, p. 12 Published in: AU.
Henry E. Lee, III, "Office Action re U.S. Appl. No. 13/122,950", Jul. 14, 2011, p. 43 Published in: US.
Borroto, Alfonso Perez, "Office Action re U.S. Appl. No. 12/507,019", Nov. 14, 2011, p. 51 Published in: US.
Korean Intellectual Property Office, "Office Action re Korean Application No. 10-2009-7025699", Jun. 1, 2011, p. 12 Published in: KR.
Sean R. O'Dowd, "Response to Jun. 3, 2011 Office Action re U.S. Appl. No. 12/830,380", Sep. 16, 2011, Published in: US.
Gilmore, Jack Arthur, "Pending U.S. Appl. No. 12/830,380 'Energy Conversion System with Fault Detection and Interruption'", Jul. 5, 2010, Published in: US.
Giffo-Schmitt, Beate, "PCT International Preliminary Report on Patentability re PCT/US08/077724", May 27, 2010, Published in: PCT.
Ha, Jeong Kyun, "PCT International Search Report re Application No. PCT/US09/051855", Mar. 22, 2010, Published in: PCT.
Guinea, William, "PCT International Search Report re Application No. PCT/US09/065629", Feb. 12, 2010, Published in: PCT.
Chinese Patent Office, "Second Office Action re Chinese Application No. 200880101640.4", Mar. 21, 2012, p. 29, Published in: CN.
Chinese Patent Office, "Office Action re Chinese Patent Application No. 200880016950.6", Apr. 17, 2012, p. 20 Published in: CN.
Japanese Patent Office, "Office Action re Japanese Application No. 2010-519272", May 25, 2012, p. 7 Published in: JP.
Korean Patent Office, "Office Action re Korean Patent Application No. 10-2011-7004034", 06192012, p. 5 Published in: KR.
Korean Patent Office, "Office Action re Korean Patent Application No. 10-2010-7002310", Aug. 13, 2012, p. 6 Published in: KR.
Rutland Wallis, Michael, "Office Action re U.S. Appl. No. 12/326,209", Mar. 23, 2012, p. 22 Published in: US.
Rutland Wallis, Michael, "Office Action re U.S. Appl. No. 12/326,209", Nov. 17, 2011, p. 31 Published in: US.
Lindner, Nora, "International Preliminary Report on Patentability re Application No. PCT/US12/023081", Aug. 9, 2012, Published in: CH.
O'Dowd, Sean R., "Response After Final Under 37 CFR 1.116 re U.S. Appl. No. 12/326,209", May 23, 2012, p. 6 Published in: US.
Lee III, Henry E., "Office Action re U.S. Appl. No. 12/122,950", Jun. 7, 2012, p. 20 Published in: US.
Sohn, Seung C., "Notice of Non-Compliant Amendment Office Action re U.S. Appl. No. 12/189,187", Aug. 12, 2009, p. 2 Published in: US.
Nguyen, Danny, "Office Action re U.S. Appl. No. 12/022,147", Jan. 22, 2010, p. 46 Published in: US.
Sohn, Seung C., "Office Action re U.S. Appl. No. 12/189,187", Apr. 3, 2009, p. 14 Published in: US.
Sohn, Seung C., "Office Action re U.S. Appl. No. 11/967,933", Oct. 4, 2010, p. 29 Published in: US.
Gardner, Shannon M., "Office Action re U.S. Appl. No. 12/184,535", Nov. 10, 2010, p. 7 Published in: US.
Moyse, Ellen, "International Preliminary Report on Patentability and Written Opinion re Application No. PCT/US08/072108", Feb. 18, 2010, Published in: PCT.
Nickitas-Etienne, Athina, "International Preliminary Report on Patentability and Written Opinion re Application No. PCT/US09/031549", Aug. 12, 2010, Published in: PCT.
Honda, Masashi, "International Preliminary Report on Patentability and Written Opinion re Application No. PCT/US09/051855", Feb. 24, 2011, Published in: PCT.
Ha, Jeong Kyun, "PCT International Search Report re Application No. PCT/US09/054904", Aug. 23, 2010, Published in: PCT.
O'Dowd, Sean R., "Response to Oct. 4, 2010 Office Action re U.S. Appl. No. 11/967,933", Jan. 1, 2011, p. 6 Published in: US.
O'Dowd, Sean R., "Response to Jan. 22, 2010 Office Action re U.S. Appl. No. 12/022,147", Feb. 25, 2010, p. 28 Published in: US.
O'Dowd, Sean R., "Response to Nov. 10, 2011 Office Action re U.S. Appl. No. 12/184,535", Mar. 10, 2011, p. 14 Published in: US.
O'Dowd, Sean R., "Response to Apr. 3, 2009 Office Action re U.S. Appl. No. 12/189,187", Jun. 29, 2009, p. 51 Published in: US.

O'Dowd, Sean R., "Response to Notice of Non-Compliant Amendment re U.S. Appl. No. 12/189,187", Aug. 13, 2009, p. 10 Published in: US.

Pinheiro, "Dual Output . . . " IEEE, PESC 96, vol. 1, pp. 733-739, Jun. 1996.

Zhang, "Single-Phase . . . " IEEE APEC 95, vol. 1 pp. 434-439, Mar. 1995.

Dawin Electronics Corp., KR 10-2006-0100840 A, Sep. 21, 2006.

Yao, et al. "Interleaved Three-Level Boost Converter with Zero Diode Reverse-Recovery Loss" 2004 IEEE Applied Power Electronics Conference and Exposition, APEC 04, vol. 2 pp. 1090-1095, Sep. 2004.

SunPower, "Surface Polarization . . . " SunTechnics SunReader, 4 pages, 2005.

IEEE, "Std, 519-1992", Apr. 12, 1993, Publisher IEEE.

Junghan Kim, "A Study on Harmonic Elimination used Passive Filter and Active Filer", "KIIEE" 2001, Publisher: KIIEE.

Kahled H. Ahmed, "Passive Filter Design for Three-Phase Inverter Interfacing in Distributed Generation", "Electrical Power Quality and Utilization Journal", 2007, Page(s) abstract, Fig. 1-19, vol. 13, No. 2.

Timothy Cy Wang, "Output Filter Design for a Grid-Interconnected Three-Phase Inverter", "IEEE", 2003 Publisher: IEEE, Published in US.

Woo-Cheol Lee, "Design of Optimum Filter in Switching Amplifier", Master thesis of Hanyang University, 1988.12.

Kwon, "Photovoltaic Power . . . " IEEE Transactions on Industrial Electronics, vol. 53, No. 4, pp. 1048-1054, Aug. 2006.

Enslin, "Integrated Photovoltaic . . . ", IEEE Transactions on Industrial Electronics, vol. 44, No. 6, pp. 769-773, Dec. 1997.

Walker, "Cascaded DC-DC . . . " IEEE Transactions on Industrial Electronics, vol. 19, No. 4, pp. 1030-1039, Jul. 2004.

Gow, "Photovoltaic Converter . . . "IEEE Proceedings Electric Power Applications, vol. 147, No. 6, pp. 535-543, Nov. 2000.

International Search Report and Written Opinion for PCT/US2008/086931 mailed Jun. 25, 2009.

International Search Report and Written Opinion for PCT/US2008/064263 mailed Oct. 31, 2008.

International Search Report and Written Opinion for PCT/US2008/072108 mailed Feb. 24, 2009.

International Search Report and Written Opinion for PCT/US09/31549 mailed Aug. 17, 2009.

International Search Report and Written Opinion for PCT/US08/77734 mailed Apr. 29, 2009.

International Search Report and Written Opinion for PCT/US08/87078 mailed Jul. 9, 2009.

DEVICE SYSTEM AND METHOD FOR COUPLING MULTIPLE PHOTOVOLTAIC ARRAYS

PRIORITY

This application is a continuation of U.S. patent application Ser. No. 12/189,187 entitled Device System and Method for Coupling Multiple Photovoltaic Arrays, filed Sep. 10, 2008.

FIELD OF THE INVENTION

This invention relates generally to apparatus and methods for converting solar energy to electrical energy, and more specifically to apparatus and methods for more efficient and/or effective conversion of solar energy to electrical energy.

BACKGROUND OF THE INVENTION

The transformation of light energy into electrical energy using photovoltaic (PV) systems has been known for a long time and these photovoltaic systems are increasingly being implemented in residential, commercial, and industrial applications. Although developments and improvements have been made to these photovoltaic systems over the last few years to improve their effectiveness and efficiency, continued improvement in effectiveness and efficiency of photovoltaic systems is being sought in order to may photovoltaic systems more economically viable.

Photovoltaic systems typically include, among other components, a photovoltaic array and a power converter. The photovoltaic array generates DC power and the power converter may be an inverter adapted to convert the DC power to AC power (e.g., single or three phase power). The power converter may perform an alternative function as well. For example, one power converter may convert an input DC voltage to a higher or lower output DC voltage. No matter the type of power converter used, it is often desirable to design and operate photovoltaic arrays so that the voltage that is input to the power converter is relatively high, and hence, current is low, in order to reduce costs associated with high-current elements, as well as to reduce energy losses associated with high currents.

Single photovoltaic arrays may operate in an open load state at 600 VDC. Two photovoltaic arrays operating as a bi-polar photovoltaic array system may operate in an open load state at 1200 VDC. Although photovoltaic array systems are capable of applying high open loaded voltages, array systems rarely run at or near this voltage because the loaded voltage of the array drops substantially once power is drawn from the arrays. For example, under a loaded condition, one typical bi-polar photovoltaic array system may operate at between 600 to 1000 VDC.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one embodiment, the invention may be characterized as a photovoltaic system including a power converter configured to convert power from one form to another form, and an interface portion adapted to couple to the power converter, a first photovoltaic array, a second photovoltaic array, and a third photovoltaic array. The interface portion in this embodiment is configured to modulate an application of a voltage from the first photovoltaic array to the second and third photovoltaic arrays so as to adjust a voltage applied from the three photovoltaic arrays to the power converter.

In another embodiment, the invention may be characterized as a method for interfacing a collection of photovoltaic arrays with a power converter such as, but not limited to, an inverter. The invention in this embodiment includes electrically isolating at least one photovoltaic array from the other photovoltaic arrays in the collection, applying an initial voltage from the collection of photovoltaic arrays to the power converter, modulating a load placed on the at least one photovoltaic array so as to reduce a voltage that is output by the at least one photovoltaic array, electrically coupling the at least one photovoltaic array with the other photovoltaic arrays, and applying power at a collective voltage from the collection of photovoltaic arrays to the power converter.

In yet another embodiment, the invention may be characterized as a photovoltaic interface including two inputs capable of coupling to a first photovoltaic array, the inputs configured to receive an output voltage from the first photovoltaic array. In addition, the interface in this embodiment includes two outputs, with one of the two outputs capable of coupling and applying a voltage to a second photovoltaic array and the other of the two outputs capable of coupling and applying a voltage to a third photovoltaic array. The interface in this embodiment is configured to gradually place a load across the two inputs so as to adjust an operating voltage applied by the second and third photovoltaic arrays to a power converter.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
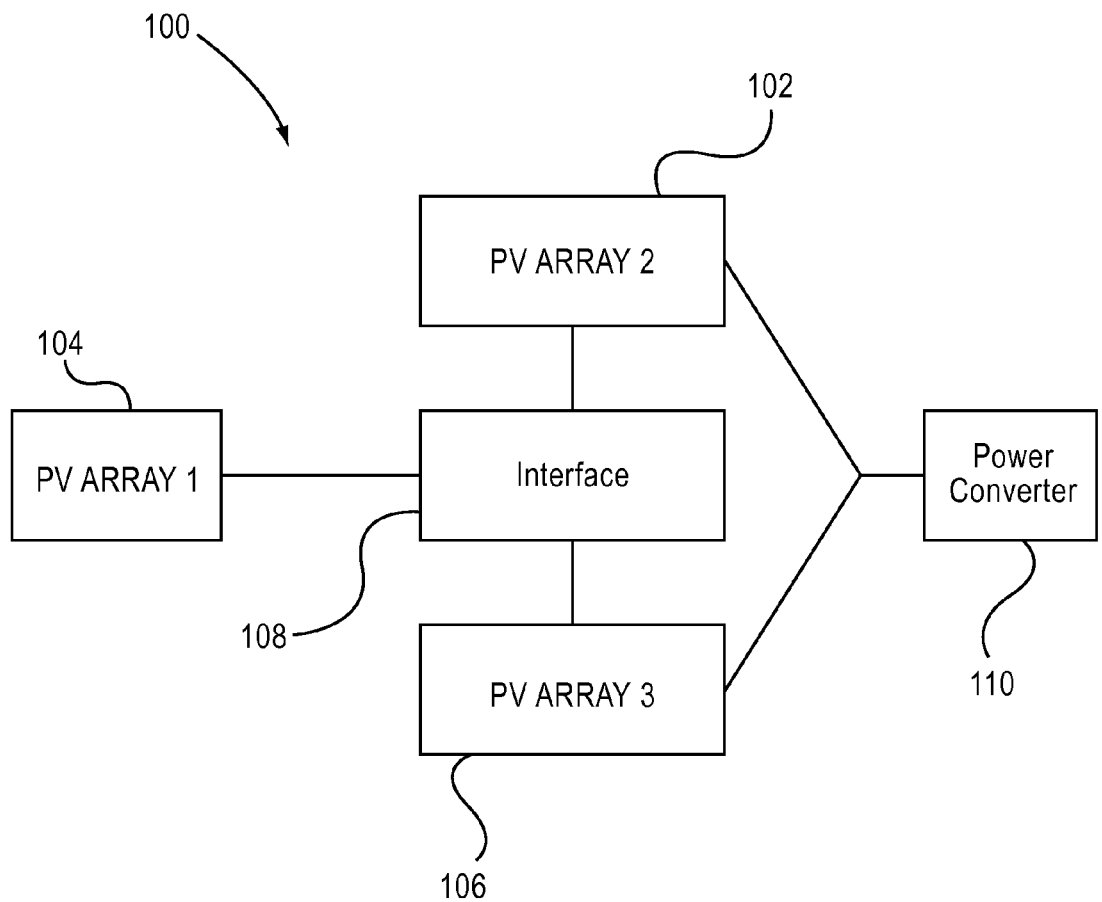
FIG. 1 is a block diagram depicting an exemplary embodiment of a photovoltaic system.

Referring now to the drawings, where like or similar elements are designated with similar reference numerals throughout the several views, and referring in particular to FIG. 1, it is a block diagram depicting a photovoltaic (PV) system 100, that includes a first photovoltaic array 104 coupled to a second photovoltaic array 102 and a third photovoltaic array 106 via a photovoltaic interface 108. As shown, the second and third photovoltaic arrays 102, 104 are also coupled to a power converter 110.

In general, the three photovoltaic arrays 102, 104, 106 convert solar energy to DC electrical power, and the power converter 110 is configured to convert the DC power from one form to another form. For example, the power converter 110 may be a DC to DC power converter that is adapted to either increase or decrease the DC voltage that is output from the arrays 102, 104, 106. And in other embodiments, the power converter may be an inverter, which converts the DC power from the arrays 102, 104, 106 to AC power (e.g., three-phase power). The PV interface 108 generally operates to enable the first, second and third photovoltaic arrays 104, 102, 106, to supply voltage to the power converter 110 at an input voltage while keeping the power converter 110 input voltage lower than +/−600V DC relative to ground, or lower than 1200V DC total rail-to-rail.

In one embodiment, the PV interface 108 is used during mid-day start ups to gradually load the first array 104 and gradually supply voltage from the first PV array 104 to the power converter 110. In some embodiments for example, a switching segment in the PV interface 108 operates for one, or just a few, second(s) during system startup. A portion of the switching segment may be pulse width modulated from a low duty cycle to a high duty cycle to gradually load the first PV array 104, and as a consequence, the gradual loading of the first array 104 pulls down the voltage of the first array 104 so that the voltage of the series combination of the three arrays 102, 104, 106 stays within an acceptable voltage level for the power converter 110 while preventing the voltage of any one of the arrays 102, 104, 106 from exceeding +/−600 VDC relative to ground.

Once the first PV array 104 is loaded, the interface 108 may bypass the switching segment by closing a first contactor, which is adapted to place the first PV array 104 in series with the second and third PV arrays 102, 106. As a consequence, in many embodiments, the power converter 110 receives a voltage from three PV arrays 102, 104, 106 (e.g., 1200VDC) that is greater than the voltage received with two PV arrays (e.g., 800 VDC), yet the voltage that is applied to the power converter is held at or below a threshold voltage (e.g., +/−600V DC) relative to ground. The increased voltage that is applied to the power converter 110 is an improvement over the prior art because there is less current loss (e.g., due to the higher voltage) than prior architectures and yet, the voltage of any single line is held below the threshold (e.g., +/−600 VDC relative to ground), which is often required (e.g., by electrical code) in the industry. Although an exemplary threshold voltage of +/−600 VDC is utilized throughout this disclosure, one of ordinary skill will appreciate that it is contemplated that, depending upon the context, other maximum voltages may govern the threshold voltage.

As discussed further herein, upon electrically coupling the first PV array 104 to the second and third PV arrays 102, 106, the three PV arrays 102, 104, 106 generally operate as a bi-polar array, with the second PV array 102 disposed to operate at a positive voltage with respect to ground, the third PV array 106 disposed so as to operate below ground, and the first PV array 104 operating above and below ground potential. For example, a positive node of the second PV array 102 may be coupled to the power converter 110 and a negative node of the third PV array may be coupled to the power converter 110. The first PV array 104 may be electrically coupled to (i) the negative node of the second PV array 102, which is generally disposed above ground potential, and (ii) the positive node of the third PV array 106, which is generally disposed below ground potential.

In addition to electrically coupling the first PV array 104 to the second and third PV arrays 102, 106, the interface 108 enables low cost and efficient power converters 110 to be utilized in connection with efficient, high voltage PV arrays 102, 104, 106. For example, instead of utilizing 1800 Volt silicon (e.g., in IGBTs of the power converter) to accommodate 1800 Volt open-load voltages across three PV arrays, 1200 Volt silicon may be implemented in the power converter 110, which possesses a lower cost than 1800V silicon. Furthermore, the PV system 100 is generally operated more efficiently than other bi-polar arrays (e.g., bi-polar arrays that operate between 800 VDC and 900 VDC) since the system will operate nearer the 1200V rating of the silicon.

Figure 2:
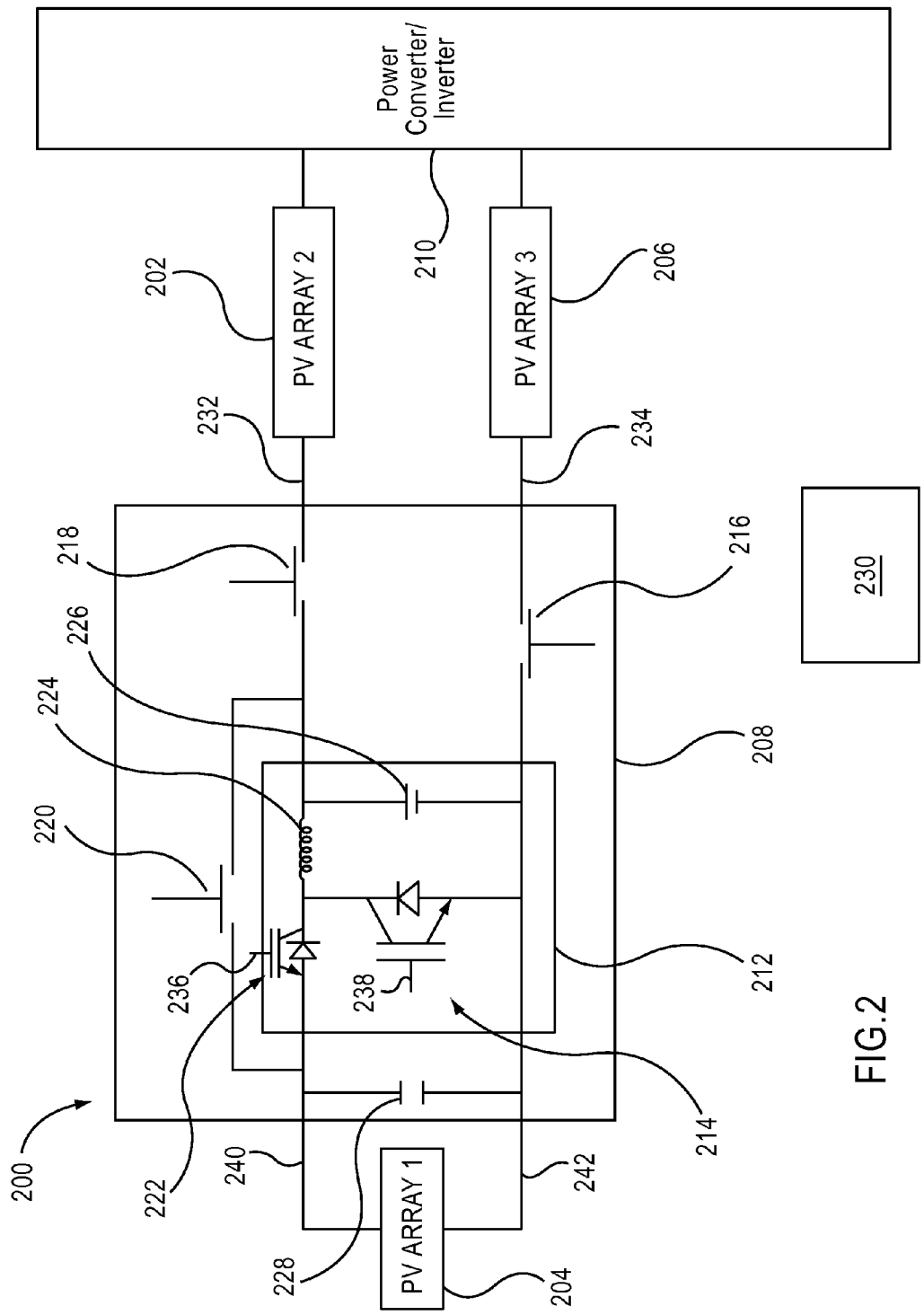
FIG. 2 is a schematic representation of an exemplary embodiment of the system described with reference to FIG. 1.

Referring next to FIG. 2, shown is a schematic representation of an exemplary embodiment of the system 100 described with reference to FIG. 1. As shown in the system 200 depicted in FIG. 2, a first photovoltaic array 204 is coupled by inputs 240, 242 to an exemplary interface 208 that includes a switching segment 212 (also known as a buck regulator). The buck regulator comprises a series switch 222 and an isolation switch 214 arranged and configured, along with other switching segment and interface features, to couple the first photovoltaic array 204 in series with the second and third photovoltaic arrays 202, 206 without the power converter 210 being exposed to greater than +/−600V DC. For example, a series inductor 224 and a first capacitor 226 work to short the first PV array 204, while a second capacitor 228 is adapted to help control the voltage supplied by the first PV array 204.

As shown, the isolation switch 214 is disposed across the positive and negative rails of the first photovoltaic array 204 (the positive and negative rails may also be referred to as the first and second rails). It is to be appreciated that in many embodiments, the isolation switch 214 is an insulated-gate bipolar transistor (IGBT) disposed so that a collector-emitter current path of the IGBT is coupled between the positive and negative rails of the first photovoltaic array 204 and the gate of the isolation switch is electronically coupled to a control segment 230 of the interface 208. In other embodiments, however, the isolation switch 214 may be implemented by other switching and control technologies without departing from the scope of the claimed invention.

The series switch 222 in one embodiment is arranged in parallel, along a positive rail of the system 200, with a first contactor 220. It is to be appreciated that in many embodiments, the series switch 222 is an insulated-gate bipolar transistor (IGBT) disposed so that a collector-emitter current path of the IGBT is coupled along the positive rail of the first photovoltaic array 204 and the gate of the series switch is electronically coupled to the control segment 230 of the interface 208. In other embodiments, however, the series switch 222 is implemented by other switching and control technologies without departing from the scope of the claimed invention. It is to be appreciated that the first contactor 220 may also be electronically coupled to the control segment 230 of the interface. Although not depicted, the series switch 222 and first contactor 220 in many alternative implementations may be arranged in parallel, along the negative rail between the first array 204 and the third array 206.

In one embodiment, the control segment 230 is realized by a processor that is configured to execute instructions stored in a memory, but this is not required, and in other embodiments, the control segment is realized by hardware. It is also contemplated that the control segment in yet other embodiments is implemented by a combination of hardware, software, and/or firmware. It should also be realized that the depiction of the control segment 230 in FIG. 2 is merely logical and the interface 208 may be controlled by control components that are distributed within and/or outside of the interface. For simplicity, connections between the control segment 230 and other portions (e.g., switching segment 212) of the system 200 are not depicted, but one of ordinary skill in the art will appreciate that the control segment 230 may be coupled to the controlled components depicted in FIG. 2.

Often, the switching segment 212 is not utilized during non-midday start ups because the voltage generated by the series combination of the first, second, and third PV arrays 202, 204, 206 (e.g., when the sun is rising) is less than the voltage generated by the series combination of the first, second, and third PV arrays 202, 204, 206 during midday. Therefore, during a non-midday start-up, the first PV array 204 may often be electrically coupled to the second and third PV arrays 202, 206 in series through the first contactor 220 because a collective voltage across the three series PV arrays 202, 204, 206 is less than a voltage that is damaging to the power converter 210.

Figure 4A:
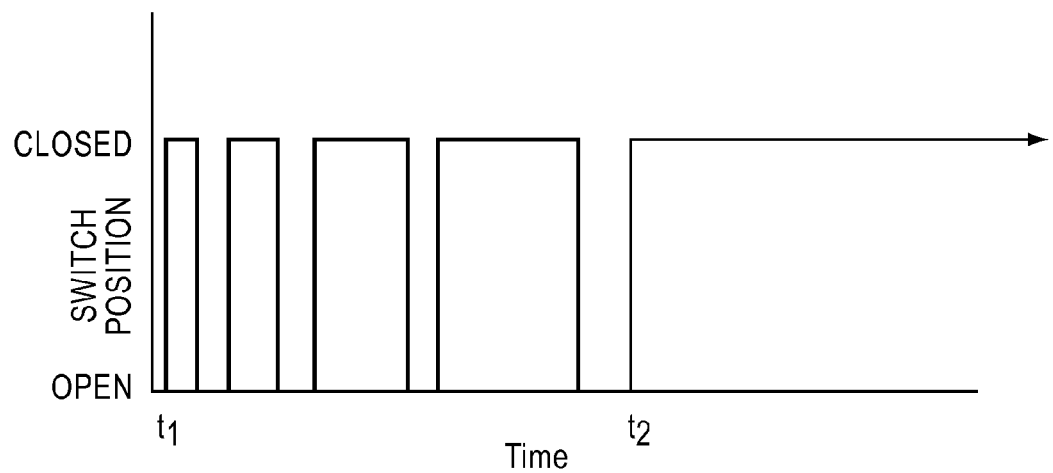
FIG. 4A is a graph depicting, as a function of time, a position of series switch depicted in FIG. 2.
Figure 4B:
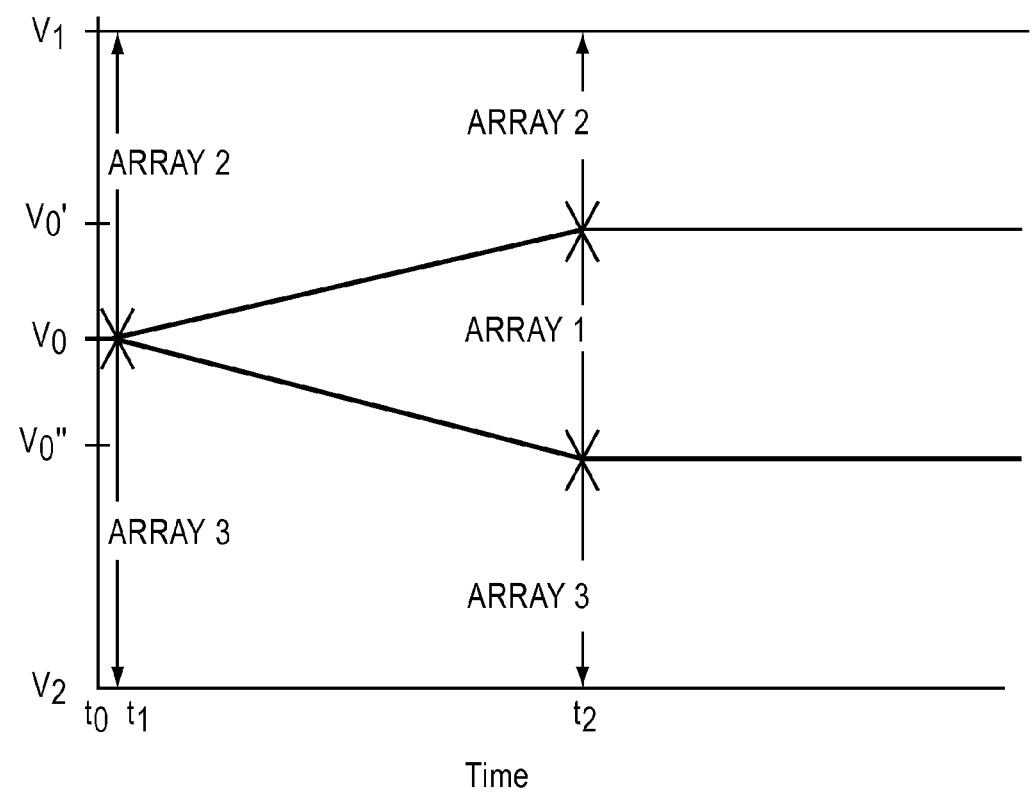
FIG. 4B is a graph depicting, as a function of time, a voltage of a first, second, and third photovoltaic arrays depicted in FIG. 2.

During a midday start up, however, the series combination of the open load voltages of the arrays 202, 204, 206 may exceed the maximum voltage of a converter (e.g., converter 210). Referring to FIG. 4B or exemplary purposes, assuming the collective voltage (between $V_1$ and $V_2$) represents the maximum voltage at which a power converter (e.g., power converter 210) may operate, and at $t_0$ the second and third arrays 202, 206 are not loaded, but are tied together in series (e.g., the first array 204 is isolated), the series combination of the open load voltages of the second and third arrays 202, 206 is already at, or near, the maximum voltage for the converter. As a consequence, adding the open load voltage of the first array 204 in series combination with the open load voltages of the second and third arrays 202, 206 would cause the open-load voltage of the series combination of the three arrays 202, 204, 206 to exceed the designed operating voltage of the power converter 210.

As a consequence, in many modes of operation, the interface 208 operates to gradually couple the first photovoltaic array 204 the array 204) to the power converter 210 so that the power converter 210 is not exposed to the potentially damaging voltage (e.g., an open load voltage) of the first, second and third photovoltaic arrays 202, 204, 206. The interface 208 is further adapted to keep the maximum voltage across any one line at a level that is not greater than +/−600V DC. Referring to FIGS. 4A and 4B, for example, shown are graphs depicting, as a function of time, a position of the series switch 222 and a collective voltage (between $V_1$ and $V_2$) of the three arrays 202, 204, 206, respectively.

Prior to an exemplary midday start-up process, each of the first, second and third photovoltaic arrays 204, 202, 206 may possess an open load voltage of about +/−600V DC relative to ground. In several embodiments (e.g., when the power converter 210 is capable of handling +/−600 VDC or 1200 Volts rail-to-rail), the second array 202 and the third array 206 may be placed online without concern for damaging the power converter 210. As a consequence, in many embodiments, the second and third arrays 202, 206 are initially arranged in series to apply a voltage across the power converter 210 while the first array 204 remains offline.

In the embodiment depicted in FIG. 2, for example, the second and third contactors 218, 216, and the isolation switch 214 are initially closed, and the first contactor 220 and the series switch 222 are initially open so as to place a series arrangement of the second and third arrays 202, 206 across the power converter 210. As shown in the exemplary embodiment depicted in FIG. 2, the second and third contactors 218, 216 may be coupled to first and second interface outputs 232, 234, respectively.

And with reference to FIG. 4B by way of further example, between time $t_0$ and $t_1$ (when the first array 204 is offline) the collective voltage (the voltage depicted between $V_1$ and $V_2$) that is applied to the converter 210 is due to the series combination of the voltage of the second array 202 (the voltage depicted between $V_1$ and $V_0$) and the voltage of the third array 206 (the voltage depicted between $V_2$ and $V_0$).

As shown in FIGS. 2 and 4A, at time $t_1$ (e.g., nearly immediately after start-up) the series switch 222 is closed briefly. In this exemplary mode of operation, a signal 236 (e.g., from control segment 230) to the series switch 222 is pulse-width modulated so that the series switch 222 is closed for successively longer amounts of time between times $t_1$ and $t_2$ so as to gradually load the arrays 202, 204, 206. Similarly, a signal 238 (e.g., from control segment 230) to the isolation switch 214 is pulse-width modulated so that the isolation switch 214 is opened during the periods the series switch 222 is closed. So, prior to time $t_1$, there is 100% duty cycle on the isolation switch 214 and 0% duty cycle on the series switch 222, while at time $t_2$, there is 0% duty cycle on the isolation switch 214 and 100% duty cycle on the series switch 222.

From time $t_1$ to $t_2$, and as shown in FIGS. 2 and 4B, as the second and third photovoltaic arrays 202, 206 are loaded, the voltage supplied to the power converter 210 from the second and third photovoltaic arrays 202, 206 starts to decrease from an initial open load voltage towards an operating voltage. More specifically, FIG. 4B shows the initial voltage supplied by the second photovoltaic array 202 as $V_1$-$V_0$, decreasing to operating voltage $V_1$-$V_{0'}$, and the initial voltage supplied by the third photovoltaic array 206 is $V_2$-$V_0$, decreasing to operating voltage $V_2$-$V_{0'''}$. During this time from time $t_1$ to $t_2$, the initial voltage supplied by the first photovoltaic array 204 increases from an initial voltage of 0 V DC to an operating voltage of $V_0$-$V_{0'''}$. As a consequence, once the first array 204 is completely online and the series combination of the three arrays are loaded (e.g., at $t_2$), each of the voltages applied by the arrays 202, 204, 206 is approximately the same (e.g., 400 VDC, but they need not be equal) and the collective voltage of the three arrays 202, 204, 206 when the three arrays are load is approximately equal to the open load voltage of the second and third arrays 202, 206 (e.g., at time $t_1$).

In some embodiments the voltage $V_1$ depicted in FIG. 4B is approximately +600V DC, $V_{0'}$ is approximately +200V DC, $V_0$ is approximately 0V, $V_{0''}$ is approximately −200V DC, and $V_{0'''}$ is approximately −600V DC. In many embodiments, once the voltage output by the first photovoltaic array 204 achieves a desirable level (e.g., an optimal level for power transfer), the first contactor 220 is closed, routing current around the buck regulator 212 and through the first contactor.

In variation of the interface 208 depicted in FIG. 2, the switching segment 212 may be replaced by a second contactor and an inductor that are arranged in series between the input 240 and output 232 (or between input 242 and output 234) and the capacitor 228 may be removed. In this embodiment, to bring the first array 204 online, the second contactor is closed, and contactors 218, 216 are closed to take the array 204 off of ground. As a consequence, a negative voltage will exist across the inductor, which is in series with the first array 204; thus the voltage of the first array 204 (e.g., 600 VDC) will be offset by the initial voltage (e.g., −500 VDC) across the inductor so that the full open load voltage of the first array 204 is not applied between the second 202 and third 206 arrays.

Figure 3:
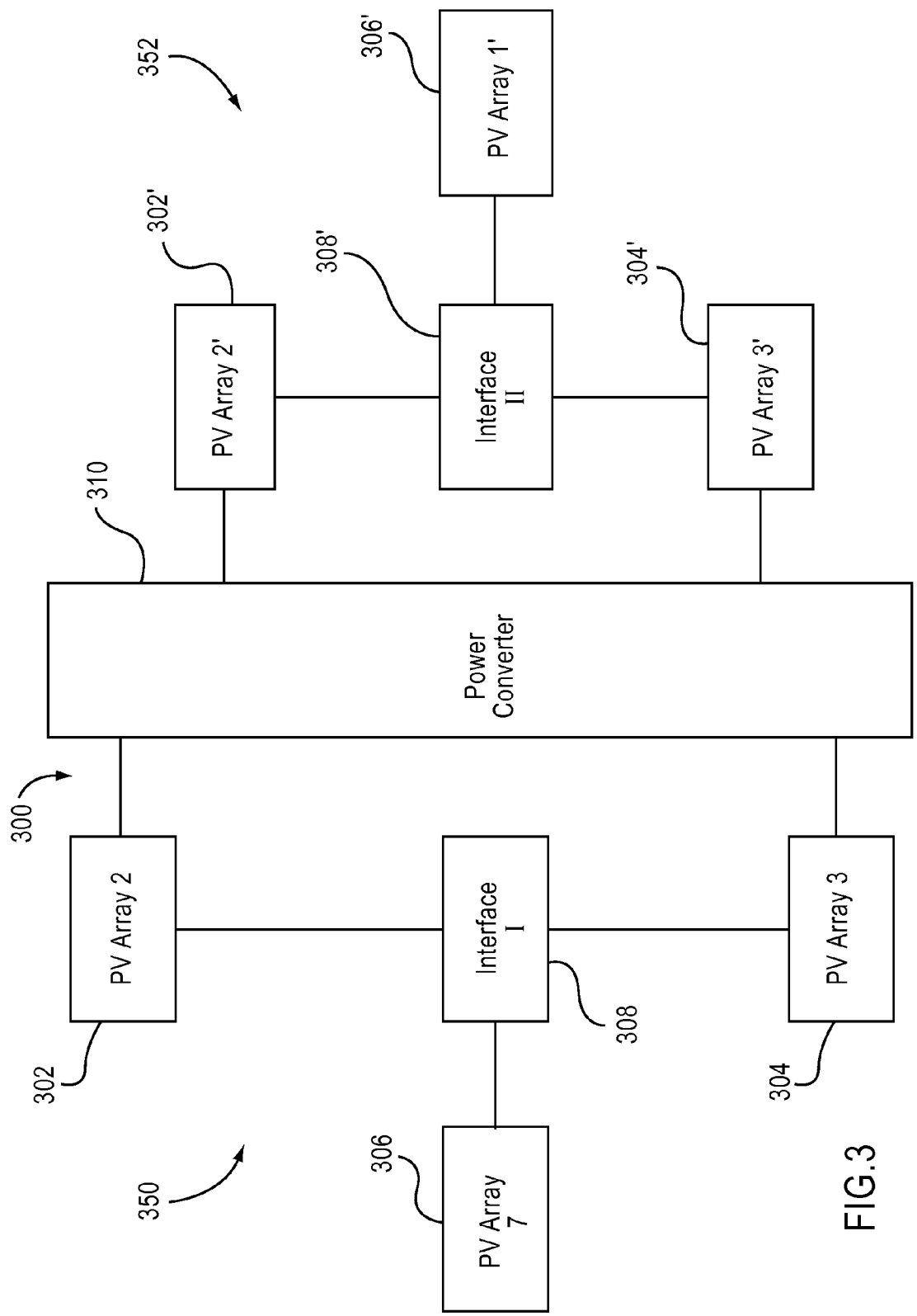
FIG. 3 is a block diagram of another exemplary embodiment of a photovoltaic system.

Referring next to FIG. 3, shown is an exemplary PV system 300 having a power converter 310 adapted to electrically couple to a first PV array interface system 350 and a second PV array interface system 352. Each of the first and the second PV array interface systems 350, 352 are similar to the systems described and shown in FIGS. 1 and 2. In this embodiment, the arrays 302, 204, 306 of the first system 350 and the arrays 302', 304', 306' of the second system 352 may be coupled in parallel at or near the power converter 310, and the first and second interface systems 350, 352 may be remotely located from each other, and each system 350, 352 may be remotely located from the power converter 310.

Figure 5:
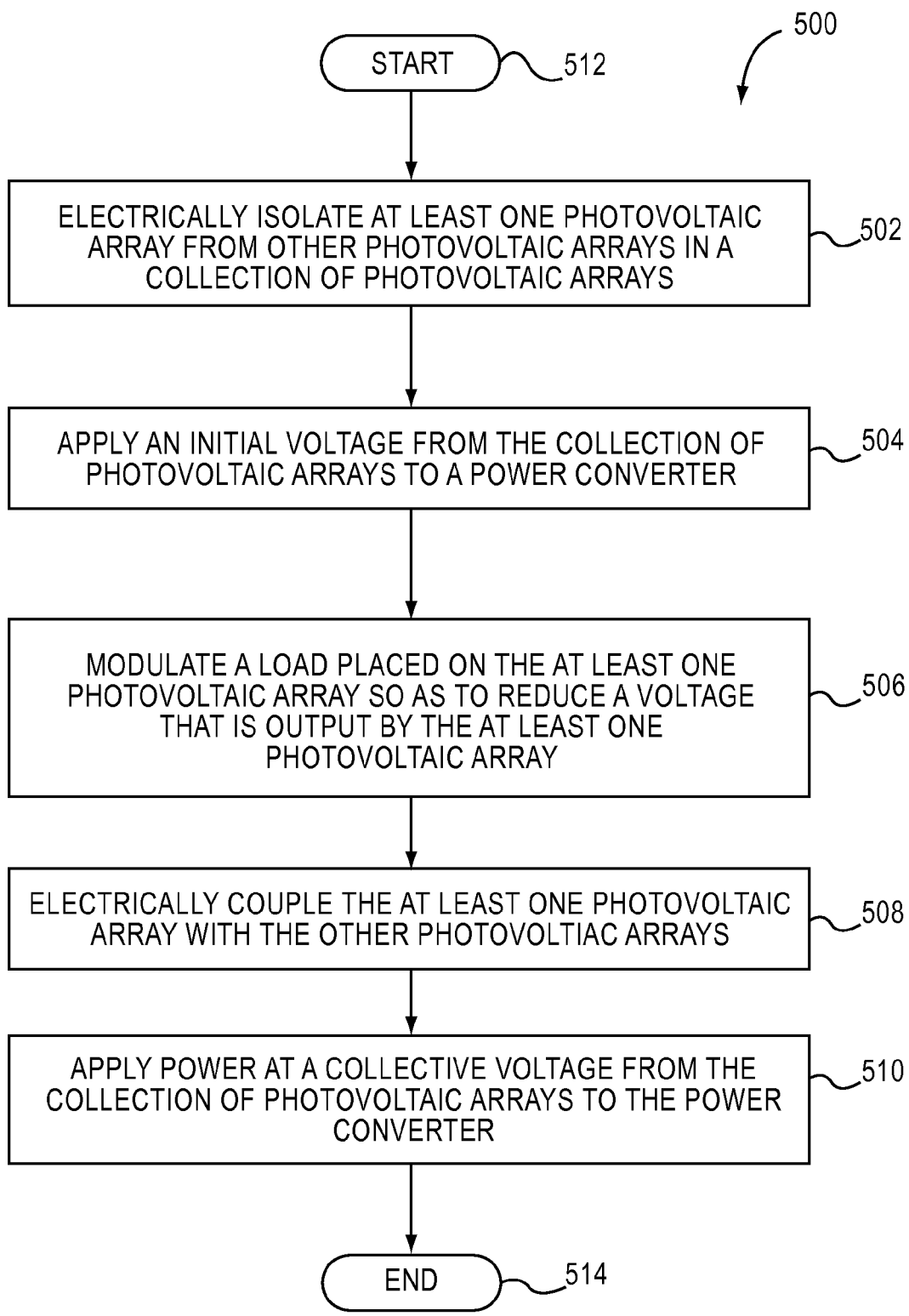
FIG. 5 is a flowchart depicting an exemplary method that may be carried out in connection with the embodiments discussed with reference to FIGS. 1-4B.

Referring next to FIG. 5, shown is a flowchart 500 depicting an exemplary method that may be carried out in connection with the embodiments discussed with reference to FIGS. 1-4. As shown, initially at least one photovoltaic array (e.g., array 104) is electrically isolated from other photovoltaic arrays (e.g., arrays 102 and 106) in a collection of photovoltaic arrays (e.g. arrays 102, 104, 106), as an initial voltage (e.g., open load voltage) is applied from the collection of photovoltaic arrays to a power converter (e.g., power converter 110)(Blocks 502, 504). A load placed on the at least one photovoltaic array is then modulated (e.g., pulse-width modulated) so the at least one photovoltaic array outputs a voltage that lowers from the initial voltage to an operating voltage, and upon electrically coupling the at least one photovoltaic array with the other arrays, becomes a part of a collective voltage applied to the power converter. (Blocks 506, 508, 510). As discussed, in some embodiments a buck regulator (e.g., buck regulator 212) that includes a series switch (e.g. series switch 222) and an isolation switch (e.g. isolation switch 214) is utilized to modulate a load that is placed on the at least one photovoltaic array so as to maintain the voltage of any rail—with respect to ground—at or below a maximum level (e.g., maximum regulatory level).

In conclusion, the present invention provides, among other things, a system and method for interfacing with multiple photovoltaic arrays. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A photovoltaic system comprising,
  a power converter configured to convert power from one form to another form; and
  an interface portion adapted to couple to the power converter, a first photovoltaic array, a second photovoltaic array, and a third photovoltaic array, the interface portion is configured to modulate an application of a voltage from the first photovoltaic array to the second and third photovoltaic arrays so as to adjust a voltage applied from the three photovoltaic arrays to the power converter.

2. The system of claim 1, wherein the power converter is selected from the group consisting of an inverter configured to convert DC power from the first, second, and third photovoltaic arrays to AC power, a DC to DC converter adapted to increase the voltage applied from the three photovoltaic arrays, and a DC to DC converter adapted to decrease the voltage applied from the three photovoltaic arrays.

* * * * *